(12) United States Patent
Haydt et al.

(10) Patent No.: US 12,487,039 B2
(45) Date of Patent: Dec. 2, 2025

(54) AIR-WATER SEPARATOR FOR CONDENSING HEAT EXCHANGER

(71) Applicant: Hamilton Sundstrand Space Systems International, Inc., Windsor Locks, CT (US)

(72) Inventors: Shane E. Haydt, Manchester, CT (US); Kimberly Rae Saviers, Glastonbury, CT (US); Joshua M. Norman, South Windsor, CT (US); Joseph C. Rampone, Colchester, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 498 days.

(21) Appl. No.: 17/963,120

(22) Filed: Oct. 10, 2022

(65) Prior Publication Data

US 2024/0118047 A1    Apr. 11, 2024

(51) Int. Cl.
| | |
|---|---|
| *B01D 45/08* | (2006.01) |
| *F28F 9/00* | (2006.01) |
| *F28F 25/02* | (2006.01) |
| *B33Y 80/00* | (2015.01) |

(52) U.S. Cl.
CPC .............. *F28F 25/02* (2013.01); *F28F 9/005* (2013.01); *B33Y 80/00* (2014.12)

(58) Field of Classification Search
CPC ........ B01D 5/009; B01D 45/08; B01D 45/10; B01D 2257/80
USPC ..................... 96/207, 215, 218; 261/DIG. 10
See application file for complete search history.

(56) References Cited

U.S. PATENT DOCUMENTS

| | | | | |
|---|---|---|---|---|
| 3,570,221 | A | * | 3/1971 | Oliver ..................... E21B 43/34 |
| | | | | 55/464 |
| 3,868,830 | A | | 3/1975 | Fletcher et al. |
| 3,870,494 | A | | 3/1975 | Doane |
| 5,487,849 | A | | 1/1996 | Curtis |
| 5,507,858 | A | * | 4/1996 | Jepson ............... B01D 19/0042 |
| | | | | 96/206 |
| 8,470,080 | B1 | | 6/2013 | Ball, IV et al. |
| 9,643,105 | B1 | | 5/2017 | Walker et al. |

(Continued)

FOREIGN PATENT DOCUMENTS

| | | |
|---|---|---|
| CN | 107091518 A | 8/2017 |
| CN | 105737647 B | 11/2017 |

(Continued)

OTHER PUBLICATIONS

English Machine Translation of FR 2570290 A1 (Year: 1986).*

(Continued)

*Primary Examiner* — Charles S Bushey
(74) *Attorney, Agent, or Firm* — CANTOR COLBURN LLP

(57) ABSTRACT

In accordance with at least one aspect of this disclosure, a system includes a liquid-gas separator. The liquid-gas separator includes: a substantially planar body configured to be seated in a fluid flow to separate a flow of liquid from the fluid flow, one or more apertures disposed in the body configured collect the flow of liquid, and one or more diverters integrally formed on or in the body configured divert the flow of liquid towards the one or more apertures. In certain embodiments, the planar body can be additively manufactured.

15 Claims, 7 Drawing Sheets

(56) References Cited

U.S. PATENT DOCUMENTS

| | | | |
|---|---|---|---|
| 2012/0125579 A1 | 5/2012 | Peyton et al. | |
| 2016/0236140 A1* | 8/2016 | Northrop | C10L 3/103 |
| 2020/0149944 A1 | 5/2020 | Haag et al. | |

FOREIGN PATENT DOCUMENTS

| | | | |
|---|---|---|---|
| FR | 2570290 A1 * | 3/1986 |
| WO | WO 2012041665 A1 * | 4/2012 |

OTHER PUBLICATIONS

English Machine Translation of WO 2012041665 A1 (Year: 2012).*
Partial European Search Report issued by Examiner Maik Skowronski, of the European Patent Office, mailed on Dec. 12, 2023, in corresponding European Patent Application No. 23202524.7.
European Search Report for Application No. 23202524.7, mailed Mar. 4, 2024, 11 page.

* cited by examiner

AIR-WATER SEPARATOR FOR CONDENSING HEAT EXCHANGER

STATEMENT OF GOVERNMENT RIGHTS

This invention was made with government support under Contract No. 80JSC021CA005 awarded by NASA. The government has certain rights in the invention.

TECHNICAL FIELD

The present disclosure relates to heat exchangers, and more particularly to water separators for condensing heat exchangers.

BACKGROUND

Closed-loop environmental systems, such as the certain aircraft or spacecraft (e.g., the International Space Station), require water to be recycled and reused. This includes any water vapor that has been evaporated or exhaled inside of the system. A condensing heat exchanger has been used on spacecraft to control air temperature and humidity, and to extract excess water vapor from the air. The vapor condenses on the heat exchanger, adheres to its hydrophilic surface, and then is collected by a slurper. Typical slurpers, which separate and collect the water without diverting the air, may not operate with high efficiency due to material and design limitations.

There is always a need in the art for improvements to water separation in condensing heat exchangers, for example in the aerospace industry. This disclosure provides a solution for this need.

SUMMARY

In accordance with at least one aspect of this disclosure, a system includes a liquid-gas separator. The liquid-gas separator comprises, a substantially planar body configured to be seated in a fluid flow to separate a flow of liquid from the fluid flow, one or more apertures disposed in the body configured collect the flow of liquid, and one or more diverters integrally formed on or in the body configured divert the flow of liquid towards the one or more apertures. In certain embodiments, the planar body can be additively manufactured.

In certain embodiments, the one or more diverters can include a pair of ramps angled oblique to a longitudinal axis of the planar body and diverging away from the planar body configured to direct the fluid flow over the pair of ramps and to separate the flow of liquid from the fluid flow and divert the flow of liquid between the pair of ramps. In certain embodiments, the pair of ramps can be arranged to form a chevron pattern, and a respective aperture of the one or more apertures is disposed at a converging point of the chevron pattern.

In certain embodiments the pair of ramps can be a first pair of ramps in a plurality of pairs of ramps, and the plurality of pairs of ramps can be disposed along an axial length of the planar body, forming a plurality of chevrons. In certain embodiments, the planar body can be a first planar body, and the system can include a second substantially planar body configured to be seated in the fluid flow opposite the first planar body forming a flow channel therebetween.

In certain such embodiments, the second planar body can include one or more apertures disposed in the second planar body configured collect a flow of liquid, and one or more diverters integrally formed on or in the second planar body configured to separate the flow of liquid from the fluid flow and divert the flow of liquid from towards the one or more apertures. The one or more diverters of the second planar body can include a plurality of pairs of ramps angled oblique to a longitudinal axis of the planar body and diverging away from the second planar body configured to direct the fluid flow over each ramp of the plurality of pairs of ramps and to separate the flow of liquid from the fluid flow and divert the flow of liquid between each the pair of ramps. Each pair of ramps of the second planar body can be arranged to form a chevron pattern, and a respective aperture of the one or more apertures of the second planar body can be disposed at a converging point of the chevron pattern. In embodiments, the plurality of pairs of ramps of the second planar body can be disposed along an axial length of the second planar body, and in certain embodiments, the plurality of pairs of ramps and plurality of apertures of the second planar body can be axially offset from the plurality of pairs of ramps and the plurality of apertures of the first planar body.

In certain embodiments, the one or more diverters can include a plurality of ramps arranged parallel to one another along an axial length of the planar body and diverging away from the planar body, the plurality of ramps configured to direct the fluid flow over each ramp of the plurality of ramps and to separate the flow of liquid from the fluid flow and divert the flow of liquid between each ramp of the plurality of ramps. In certain such embodiments, the one or more apertures can be disposed in an alternating pattern with the plurality of ramps.

In certain embodiments, the first planar body is a first planar body, and the system can also include a second substantially planar body configured to be seated in the fluid flow opposite the first planar body forming a flow channel therebetween. In certain such embodiments, the second planar body can include one or more apertures disposed in the second planar body configured collect a flow of liquid, and one or more diverters integrally formed on or in the second planar body configured divert the flow of liquid from towards the one or more apertures. The one or more diverters of the second planar body can include a plurality of ramps arranged parallel to one another along an axial length of the second planar body and diverging away from the planar body, the plurality of ramps of the second planar body configured to direct the fluid flow over each ramp of the plurality of ramps and to separate the flow of liquid from the fluid flow and divert the flow of liquid between each ramp of the plurality of ramps. In certain embodiments, the plurality ramps and plurality of apertures of the second planar body can be axially offset from the plurality of ramps and the plurality of apertures of the first planar body.

In certain embodiments, the one or more diverters can include a pair of ramps diverging away from the planar body and arranged such that an apex of each ramp in the pair of ramps are adjacent to one another and defining a trench therebetween. In certain such embodiments, the one or more diverters can be configured to direct the fluid flow over each apex of the pair of ramps and over the trench and to separate the flow of liquid from the fluid flow and divert the flow of liquid into the trench. In certain embodiments, the one or more apertures can be disposed at a bottom of the trench. In embodiments, a drop off angle between the apex of each ramp and a side wall of the trench can be about 90 degrees.

In certain embodiments, the planar body includes a plurality of diverters disposed along an axial length of the planar body. In embodiments, the planar body can be a first planar body, the system can include a second substantially planar body configured to be seated in the fluid flow opposite the first planar body forming a flow channel therebetween. The second planar body can include one or more apertures disposed in the second planar body configured collect a flow of liquid and one or more diverters integrally formed on or in the second planar body configured divert the flow of liquid from towards the one or more apertures.

In certain embodiments, the one or more diverters of the second planar body can include a pair of ramps diverging away from the second planar body and arranged such that an apex of each ramp in the pair of ramps are adjacent to one another and defining a trench therebetween, the one or more diverters of the second planar body configured to direct the fluid flow over each apex of the pair of ramps and over the trench and to separate the flow of liquid from the fluid flow and divert the flow of liquid into the trench. The second planar body can include a plurality of diverters disposed along an axial length of the second planar body, and in certain embodiments, the plurality of diverters of the second planar body can be axially offset from the diverters of the first planar body.

In certain embodiments, the one or more diverters can include a hydrophilic coating disposed on one or more portions of the planar body configured to separate the flow of liquid from the fluid flow and divert the flow of liquid towards the one or more apertures. In certain embodiments, the one or more diverters can include a hydrophobic coating disposed on one or more portions of the planar body configured to separate the flow of liquid from the fluid flow and divert the flow of liquid towards the one or more apertures.

In certain embodiments, the one or more diverters can include a divot defined in the planar body and converging into the planar body. In certain such embodiments, the one or more apertures can be disposed at a bottom of the divot, the trench configured to direct the fluid flow over the divot and to separate the flow of liquid from the fluid flow and divert the flow of liquid into the divot.

In certain embodiments, the planar body can include a hollow bar, and the one or more diverters can include a rounded edge of the hollow bar. In embodiments, the one or more apertures can include a plurality of apertures disposed along an axial length of the bar, and in certain embodiments, the plurality of apertures can be disposed in a face of the hollow bar parallel to the fluid flow. In embodiments, the one or more apertures can include a plurality of apertures disposed in a downstream edge of the hollow bar relative to the fluid flow to direct the fluid flow over the face of the planar body and configured to separate the flow of liquid from the fluid flow and divert the flow of liquid along the downstream edge of the hollow bar and into the plurality of apertures.

In embodiments, the system can include a heat exchanger body having a heat exchanger core. The heat exchanger core can include airflow gas flow path defined between a gas inlet and a gas outlet and a condensate flow path defined between the one or more apertures of the liquid-gas separator and a condensate outlet. The liquid-gas separator can be disposed in the heat exchanger core in the gas flow path, and in certain embodiments the liquid-gas separator can be formed integrally with or by the heat exchanger core. The liquid-gas separator can be configured to separate the flow of liquid from a flow of gas, direct the flow of gas to the gas outlet and divert the flow of liquid to through the apertures and to the condensate outlet. In certain embodiments, the heat exchanger body can include a cross flow heat exchanger body, and can further include a liquid flow path defined between a liquid inlet and a liquid outlet, wherein the liquid flow path is fluidly isolated from the gas flow path and the condensate flow path.

In embodiments, the liquid-gas separator can be configured separate the flow of liquid from a flow of gas, direct the flow of gas to the gas outlet and divert the flow of liquid through the apertures and to the condensate outlet in a weightless environment. In embodiments, the weightless environment can include a spacecraft in outer space.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
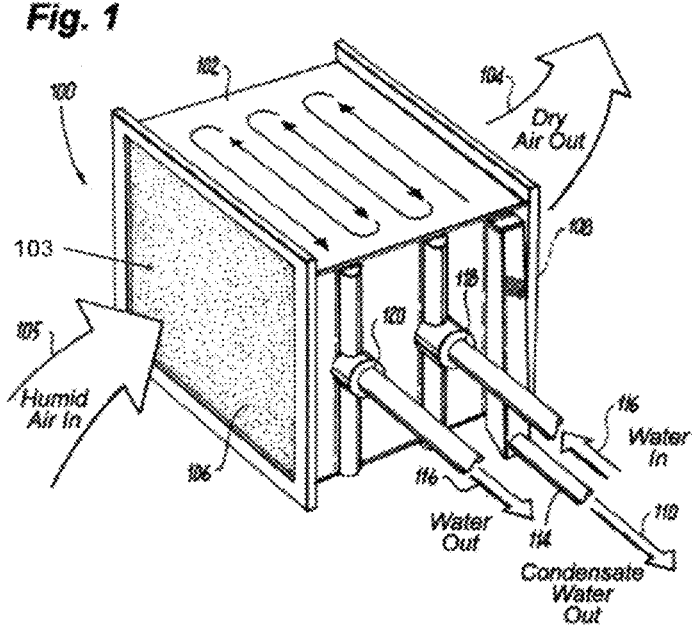
FIG. 1 is a schematic perspective view of a system in accordance with this disclosure, showing a heat exchanger body.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-14.

With reference to FIG. 1, in accordance with at least one aspect of this disclosure, a system 100 includes a heat exchanger body 102 having a heat exchanger core 103. The heat exchanger body 102 and core 103 can define, a gas flow path 104 defined between a gas inlet 106 and a gas outlet 108. A condensate flow path 110 can be defined between one or more apertures of a liquid-gas separator 200 and a condensate outlet 114. The liquid-gas separator 200 can be disposed in the heat exchanger body 102 in a fluid flow path 105 (e.g., the gas flow path 104 having a mixture of liquid and gas therein).

In embodiments, the liquid-gas separator 200 can be configured to separate the fluid flow 105 into the flow of gas 104 and a flow of liquid 110. The liquid-gas separator 200 can also be configured to direct the flow of gas 104 to the gas outlet 108 and divert the flow of liquid 110 from the fluid flow 105 to and through the apertures and to the condensate outlet 114. In certain embodiments, the heat exchanger body 102 can include a cross flow heat exchanger body, and can further include a liquid flow path 116 defined between a liquid inlet 118 and a liquid outlet 120, wherein the liquid flow path 116 is fluidly isolated from gas flow path 104 and the condensate flow path 110. In embodiments, the separator 200 can be configured to direct the flow of gas 104 to the gas outlet 108 and divert the flow of liquid 110 to and through the apertures and to the condensate outlet 114 in a weightless environment, for example if the system 100 is included in a spacecraft 122 travelling to, from or within outer space at a constant velocity.

In certain embodiments, the liquid-gas separator 200 can be or include an air-water separator configured to separate a flow of air (e.g., gas flow 104) and a flow of water (e.g., liquid flow 110) from the fluid flow 105. For clarity and ease of explanation, the liquid-gas separator 200 is hereinafter referred to as air-water separator 200, and the respective flows therein are referred to as flow of air 104 and flow of water 110. One skilled in the art having the benefit of this disclosure however would readily appreciate the separator 200 can be used for separating liquids and gases other than water and air as dictated by the particular heat exchanger or system with which it is used.

Figure 2:
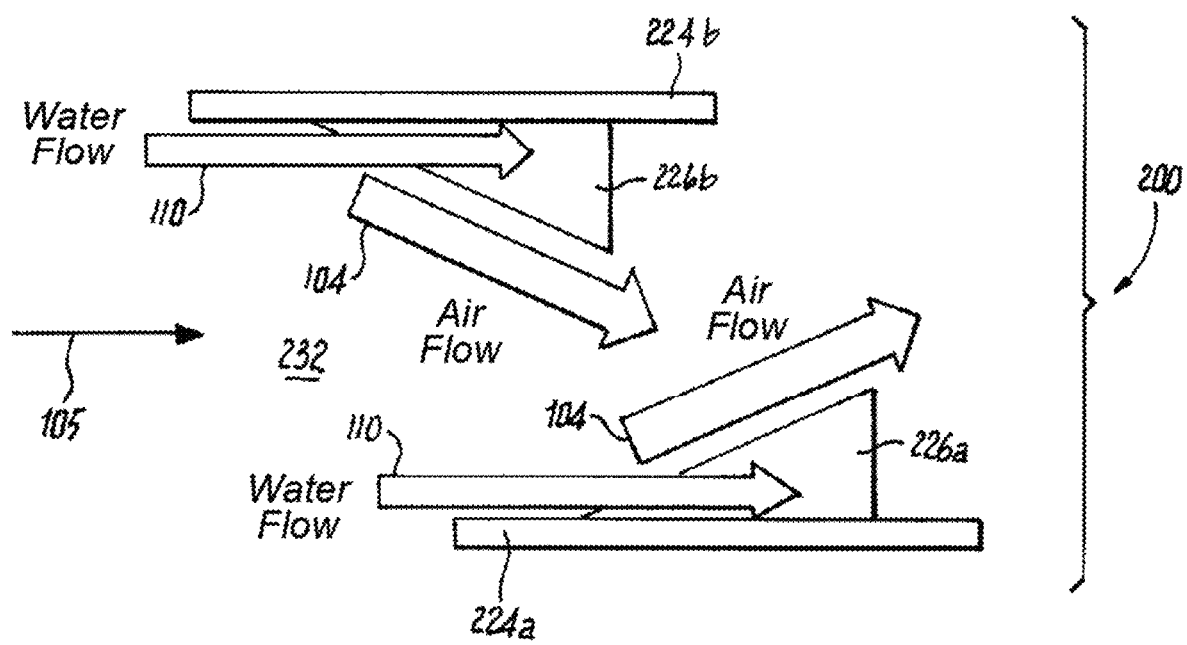
FIG. 2 is a schematic side elevation view of a liquid-gas separator for use with the heat exchanger body of FIG. 1.
Figure 3:
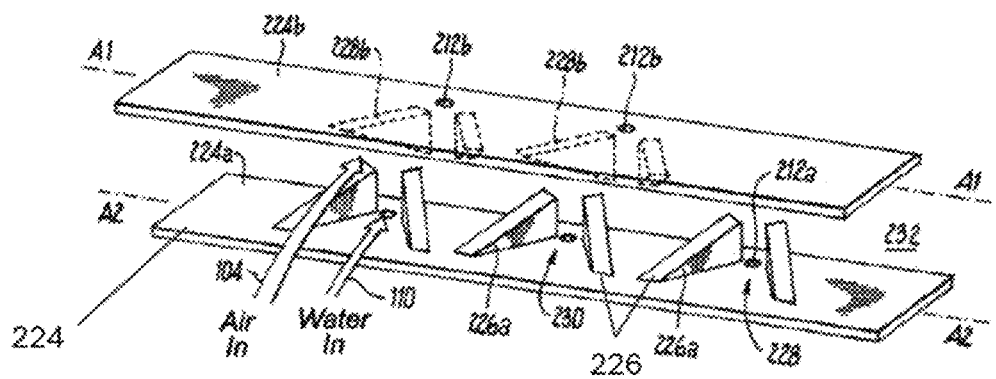
FIG. 3 is a perspective view of the liquid-gas separator of FIG. 2.
Figure 4:
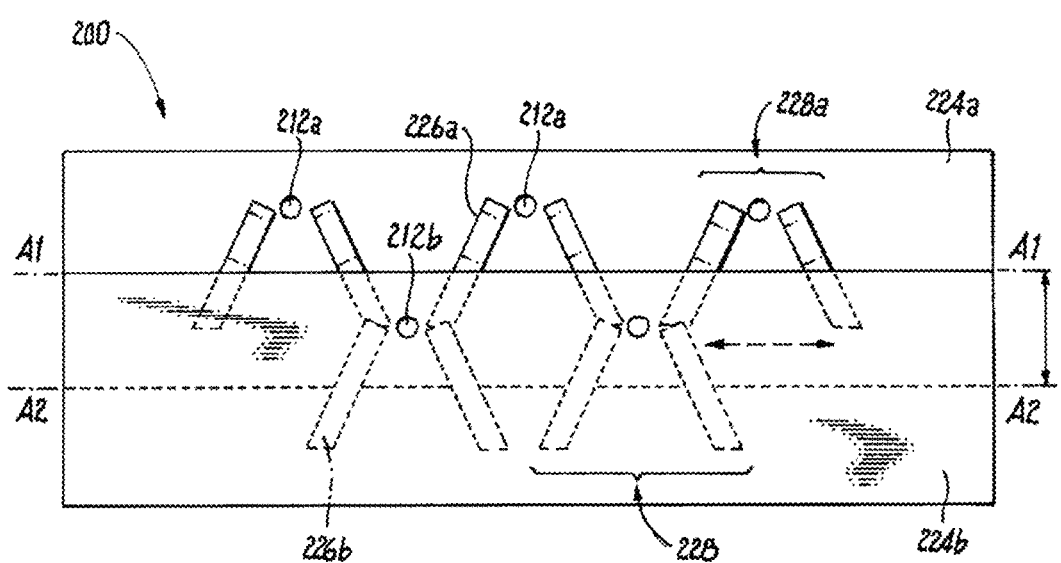
FIG. 4 is a top down view of the liquid-gas separator of FIG. 2.

In certain embodiments, with reference now to FIGS. 2-4, the air-water separator 200 can include a substantially planar body 224 configured to be seated in the fluid flow 105 to separate the flow of water 110 from the flow of air 104 in the fluid flow 105. The one or more apertures can be disposed in the body 224 configured collect the flow of water 110, and one or more diverters 226 can be integrally formed on or in the body 224 configured divert the flow of water 110 towards the one or more apertures. In certain embodiments, the planar body 224 can be additively manufactured.

As shown in FIGS. 3-4, the one or more diverters 226 can include a pair of ramps 228 angled oblique to a longitudinal axis A of the planar body 224 and diverging away from the planar body 224 configured to direct the flow of air 104 over the pair of ramps 228 and to divert the flow of water 110 between the pair of ramps 228. In certain embodiments, e.g., as shown, the pair of ramps 228 can be arranged to form a chevron pattern, and a respective aperture of the one or more apertures can be disposed at a converging point 230 of the chevron pattern. While triangular ramps are shown, any suitable shaped ramp is contemplated herein, for example rounded triangular ramps. Further, the apertures can be included in any suitable location along the axial length of the body 224 and in any suitable pattern with respect to the ramps 228.

Still with reference to FIGS. 2-4, the pair of ramps 228 can be a first pair of ramps 228a in a plurality of pairs of ramps, and the plurality of pairs of ramps can be disposed along an axial length of the planar body 224, forming a plurality of chevrons. In embodiments the planar body 224 can be a first planar body 224a, and the system can include a second substantially planar body 224b configured to be seated in the fluid flow 105 opposite the first planar body 224a forming a flow channel 232 therebetween.

As shown, the second planar body 224b can be substantially similar to the first planar body 224a. The plurality of pairs of ramps 228b and apertures 212b of the second planar body 224b can be disposed along an axial length of the second planar body 224b but can be axially offset from the plurality of pairs of ramps 228a and the plurality of apertures 212a of the first planar body 224a. As seen more clearly in FIG. 4, the first and second planar bodies 224a, 224b can also be offset from each other in a direction perpendicular to the longitudinal axis A1, A2 of the first and second planar bodies 224a, 224b. The blockage in the fluid flow 105 created by the chevrons 228 will create a recirculation region for the airflow 104, causing the bulk flow to travel up the ramps and impinge on the opposite wall.

Figure 5:
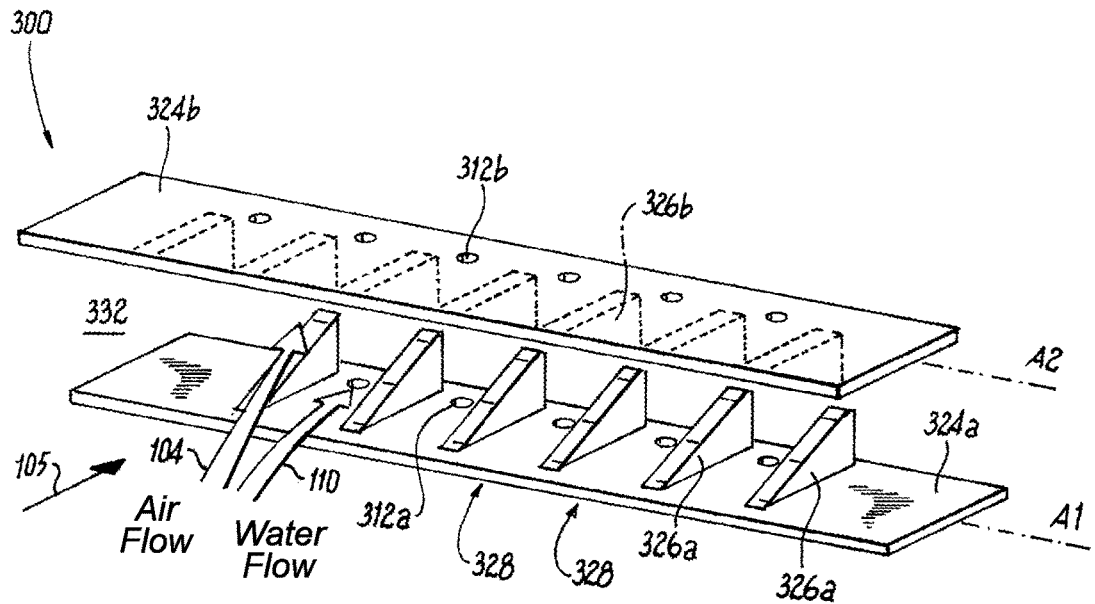
FIG. 5 is a perspective view of another embodiment of a liquid-gas separator for use with the heat exchanger body of FIG. 1.
Figure 6:
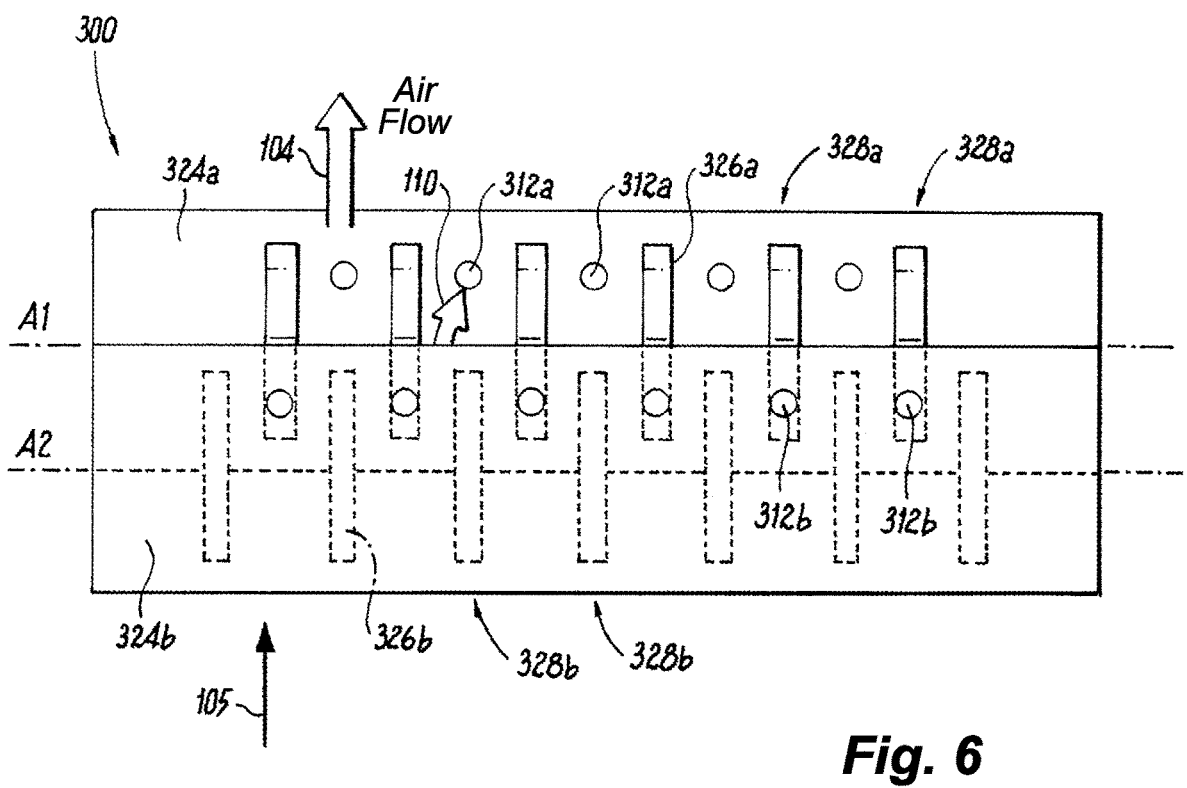
FIG. 6 is a top down view of the liquid-gas separator of FIG. 5.

With reference now to FIGS. 5 and 6, another embodiment of an air-water separator 300 is shown. The air-water separator 300 can be similar to that of the air-water separator 200, for example air-water separator 300 can have similar components and features with respect to air-water separator 200. For brevity, the description of common elements that have been described above for air-water separator 200 are not repeated with respect to air-water separator 300 as shown in FIGS. 5-6. In air-water separator 300, the one or more diverters 326 can include a plurality of ramps 328 arranged parallel to one another along the axial length of the planar body 324 to direct the flow of air 104 over each ramp 328 and to divert the flow of water 110 between each ramp 328. As shown, the one or more apertures 212 can be disposed in an alternating pattern with the plurality of ramps 328.

As shown in FIG. 6, the plurality of ramps 328b and plurality of apertures 312b of the second planar body 324b can be axially offset from the plurality of ramps 328a and the plurality of apertures 312a of the first planar body 324a and in a direction perpendicular to the longitudinal axis of the planar bodies 324a, 324b. Orienting the ramps 328 in the direction of the air flow 104 will reduce the pressure drop created by the obstruction. Axially offsetting the ramps on the top (e.g., 328b) and bottom (e.g., 328a) will impinge the air 104 onto the opposite surface and encourage the water 110 towards the holes 312.

Figure 7:
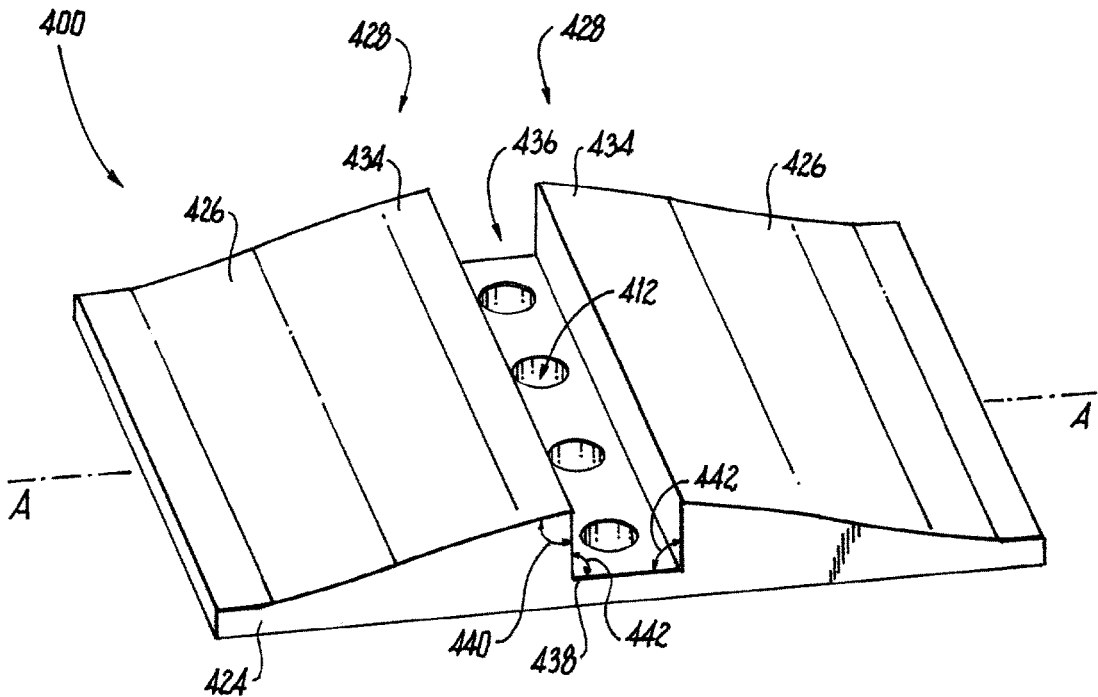
FIG. 7 is a partial perspective view of another embodiment of a liquid-gas separator for use with the heat exchanger body of FIG. 1.
Figure 8:
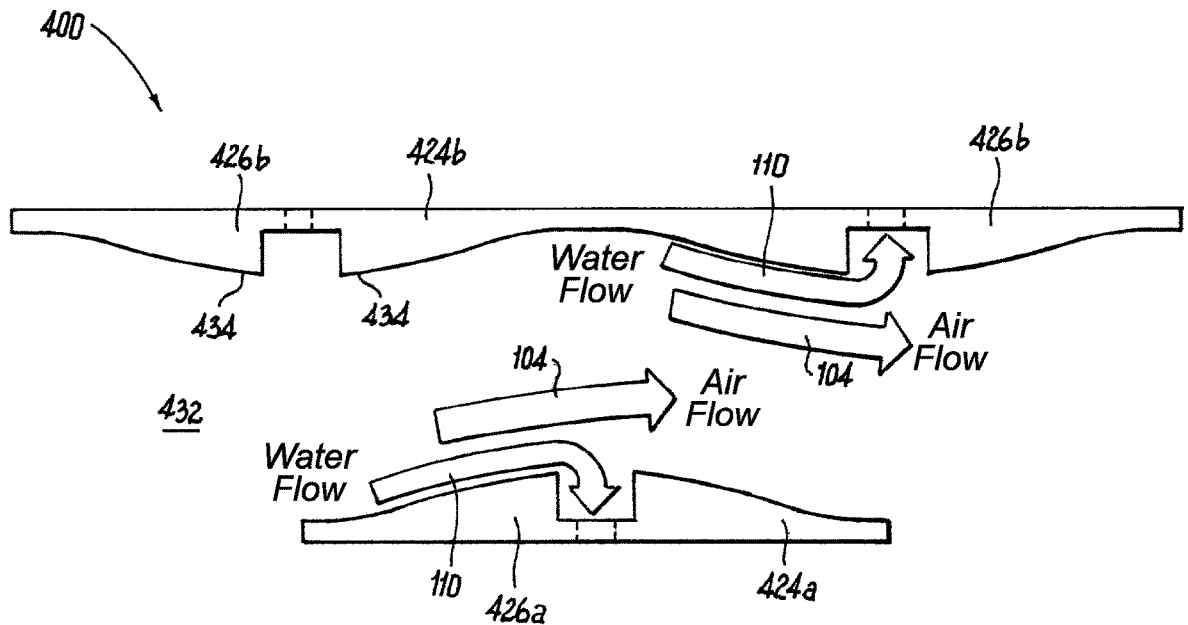
FIG. 8 is a side elevation view of the liquid-gas separator of FIG. 7.

With reference now to FIGS. 7 and 8, another embodiment of an air-water separator 400 is shown. The air-water separator 400 can be similar to that of the air-water separators 200, 300, for example air-water separator 400 can have similar components and features with respect to air-water separators 200, 300. For brevity, the description of common elements that have been described above for air-water separators 200, 300 are not repeated with respect to air-water separator 400 as shown in FIGS. 7-8. In air-water separator 400, the one or more diverters 426 can include a pair of ramps 428 diverging away from the planar body 424a and arranged such that an apex 434 of each ramp 426 are adjacent to one another and define a trench 436 therebetween.

The one or more diverters 426 can be configured to direct the flow of air 104 over each apex 434 and over the trench 436 and to divert the flow of water 110 into the trench 434. In certain embodiments, the one or more apertures 414 can be disposed at a bottom 438 of the trench 436. In embodiments, a drop off angle 440 between the apex 434 of each ramp 428 and a side wall 442 of the trench 436 can be about 90 degrees. Here, the air 104 will pass over the trench 436, because the Reynolds number of the air 104 will be too high to make the turn at the drop off angle 436 (e.g., in some case about 90 degrees). The water 110 will have a lower Reynolds number and will drop off into the trench 436, where it can drain into the apertures 412.

A second planar body 424b (e.g., substantially similar to the first planar body 424a) can be included opposite the first planar body forming a flow channel 432 therebetween. As shown in FIG. 8, the plurality of diverters 426b of the second planar body 424b can be axially offset from the diverters 426a of the first planar body 424a. Because of the axial offset, the channel 426 will have the same height along the entirety of the fluid flow path within the heat exchanger body. In certain embodiments, the one or more apertures can be included in any suitable pattern relative to the trench 436 and the ramps 428, for example, apertures 412 can additionally be included at the apex 434 of each ramp 428. One or more additional obstructions may be included along the length of the trench 436 to guide the water 110 toward the apertures 412.

For example, in certain embodiments, intermittent, discontinuous 'speed bumps' may be included where the speed bumps on an upstream and downstream side of the planar body are different heights. For example, if the speed bump on the downstream side of the planar body is taller than the upstream side, the downstream speed bump would catch any water droplets that are still in the air stream and may have deflected off of the upstream speed bump, and direct the water to the respective aperture. In contrast, if the speed bump on the upstream side is taller than the downstream side, a stronger low-pressure region would be formed in the valley between the upstream and downstream speed bumps, while not obstructing any downstream flow. One skilled in the art having the benefit of this disclosure would appreciate that feature size/shape of the diverters on the planar body can be optimized based on one or more conditions, such as flow rate, water content, water adherence to a given surfaces, fluid type, and the like.

Figure 9:
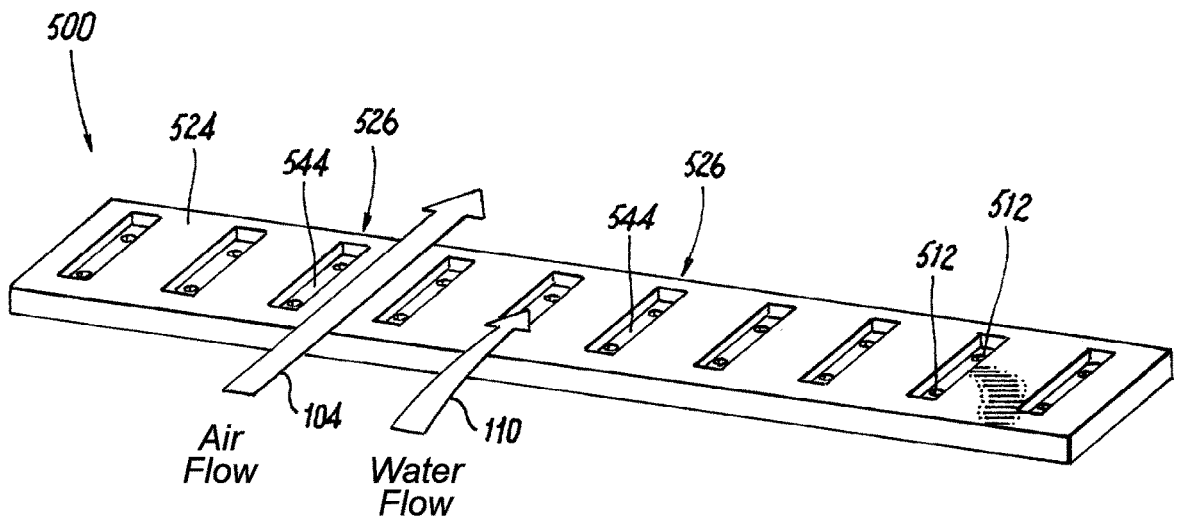
FIG. 9 is a perspective view of another embodiment of a liquid-gas separator for use with the heat exchanger body of FIG. 1.
Figure 10:
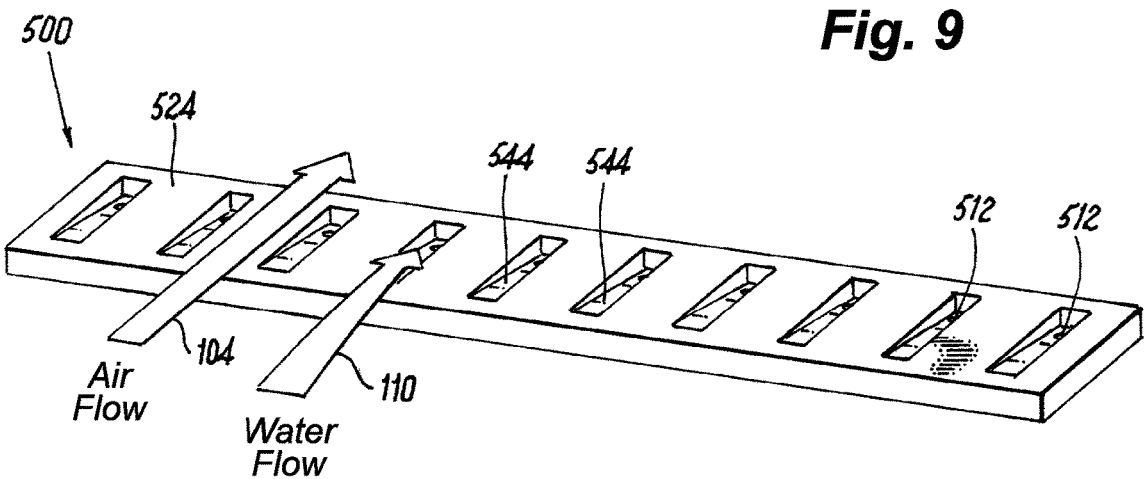
FIG. 10 is a perspective view of another embodiment of a liquid-gas separator for use with the heat exchanger body of FIG. 1.
Figure 11:
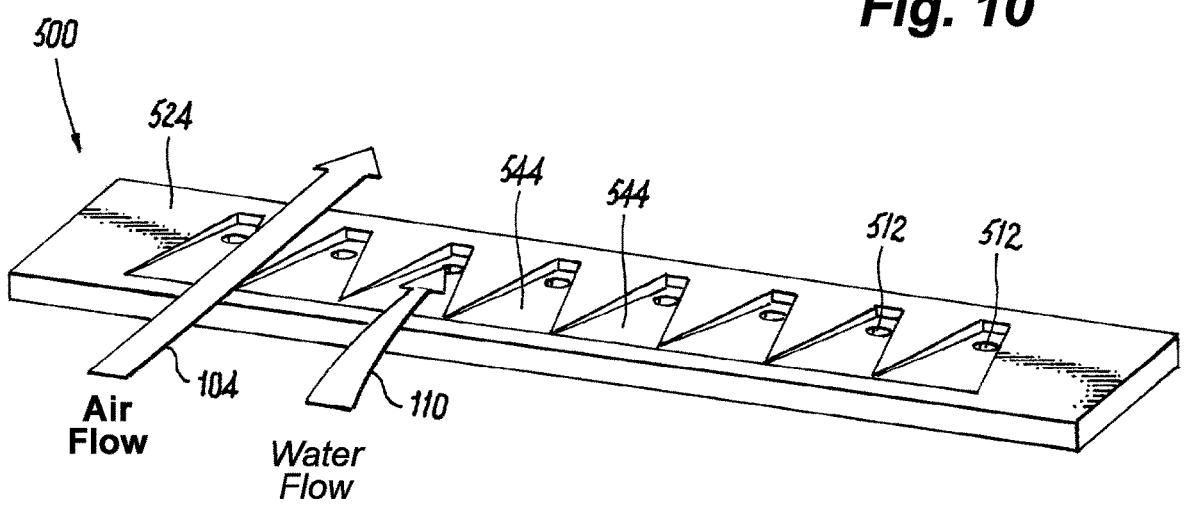
FIG. 11 is a perspective view of another embodiment of a liquid-gas separator for use with the heat exchanger body of FIG. 1.

With reference now to FIGS. 9-11, another embodiment of the air-water separator 500 is shown. The air-water separator 500 can be similar to that of the air-water separators 200, 300, 400, for example air-water separator 500 can have similar components and features with respect to air-water separators 200, 300, 400. For brevity, the description of common elements that have been described above for air-water separators 200, 300, 400 are not repeated with respect to air-water separator 500 as shown in FIGS. 9-11. In air water separator 500, the one or more diverters 526 can include a divot 544 defined in the planar body 524 and converging into the planar body 524. As shown, the one or more apertures 512 can be disposed at a bottom (e.g., the lowest point) of the divot 544, the divot 544 configured to divert the flow of water 110 into the divot 544 and through the aperture 512 and to direct the flow of air 104 over the divot 544.

The divot 544 can take any suitable shape, for example a flat rectangular recess as shown in FIG. 9, a rectangular sloped recess converging into the planar body as shown in FIG. 10, a trapezoidal sloped recess converging into the planar body as shown in FIG. 11, or any suitable combination thereof. Additionally, while not shown, any one of air-water separators 500 as shown in FIGS. 9-11 can include a second planar body positioned in the fluid flow opposite the first planar body to form a flow channel therebetween, the second planar body being offset from the first planar body in at least on direction (e.g., as described above with respect to air-water separators 200, 300, 400).

Figure 12:
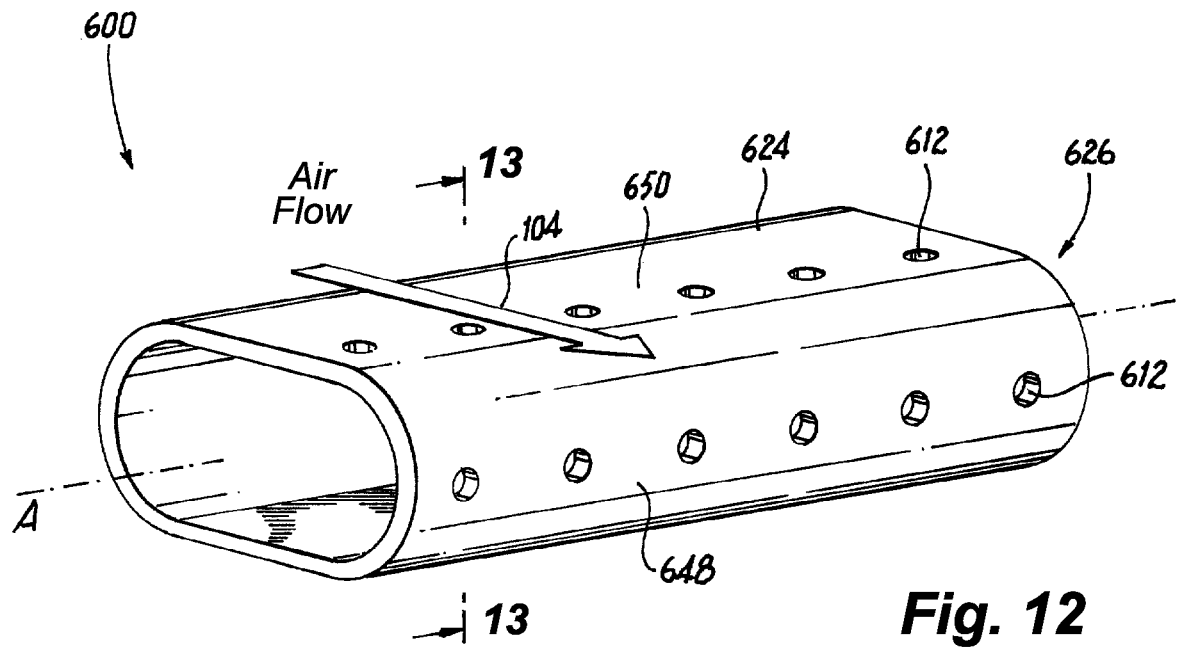
FIG. 12 is a perspective view of another embodiment of a liquid-gas separator for use with the heat exchanger body of FIG. 1.
Figure 13:
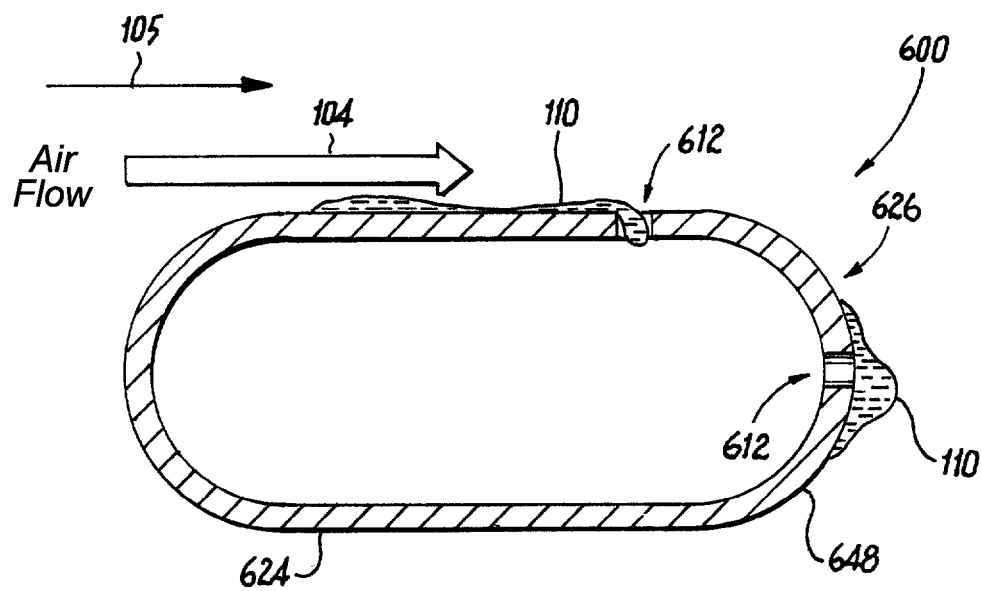
FIG. 13 is a side elevation view of the liquid-gas separator of FIG. 12.

With reference now to FIGS. 12 and 13, another embodiment of an air-water separator 600 is shown. The air-water separator 600 can be similar to that of the air-water separators 200, 300, 400, 500, for example air-water separator 600 can have similar components and features with respect to air-water separators 200, 300, 400, 500. For brevity, the description of common elements that have been described above for air-water separators 200, 300, 400, 500 are not repeated with respect to air-water separator 600 as shown in FIGS. 12 and 13. In air-water separator 600, the planar body 624 can include a hollow bar, and the one or more diverters 626 can include a rounded edge 648 of the hollow bar.

The one or more apertures 612 can include a plurality of apertures 612 disposed along an axial length of the bar 624 in at least one of a face 650 or an edge 648 of the hollow bar 624. For example, the plurality of apertures 612 can be disposed in a face 650 of the hollow bar 624 parallel to the fluid flow 105 and airflow 104. The one or more apertures 612 can additionally or alternatively include a plurality of apertures 612 disposed in a downstream edge (e.g., edge 648) of the hollow bar 624 relative to the fluid flow 105 to direct the flow of air 104 over the face 650 of the planar body 624 and configured to divert the flow of water 110 along the downstream edge 648 of the bar 624 and into the plurality of apertures 612. In embodiments, (e.g., as explained further below with respect to air-water separator 700), the planar body 624 can include a hydrophilic coating or a hydrophobic coating. If the surface tension force from the hydrophilic coating outweighs the viscous force from the airflow 104, the water 110 will remain attached to the bar 624 and collect on the back surface (e.g., downstream edge 648) and enter apertures 612.

Figure 14:
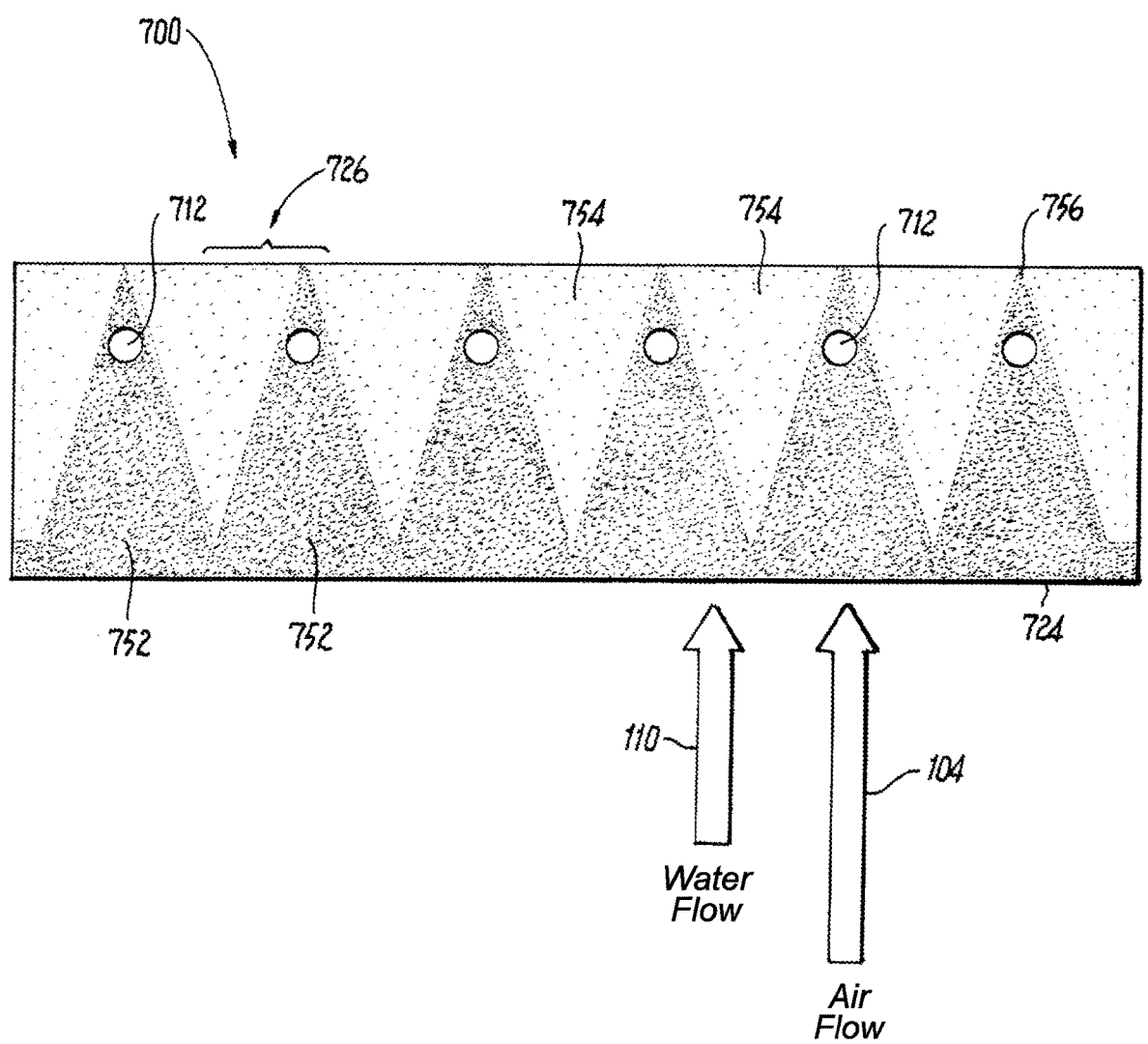
FIG. 14 is top down view of another embodiment of a liquid-gas separator for use with the heat exchanger body of FIG. 1.

With reference now to FIG. 14, another embodiment of an air-water separator 700 is shown. The air-water separator 700 can be similar to that of the air-water separators 200, 300, 400, 500, 600, for example air-water separator 700 can have similar components and features with respect to air-water separators 200, 300, 400, 500, 600. For brevity, the description of common elements that have been described above for air-water separators 200, 300, 400, 500, 600 are not repeated with respect to air-water separator 700 as shown in FIG. 14. In air-water separator 700, the one or more diverters 726 can include either or both of a hydrophilic 752 and/or a hydrophobic 754 coating disposed on one or more portions of the planar body 724 configured to divert the flow of water 110 towards the one or more apertures 712.

For example, as shown, a hydrophilic coating 752 can be disposed on the planar body 724 in a triangular pattern, where a point 754 of the triangle converges on a respective aperture 712. The remainder of the planar body 724 may be coated with the hydrophobic coating 754 to coax the water to the hydrophilic portions. The hydrophilic coating 752 can be selectively and strategically applied in a pattern that will help collect water 110 at the apertures 712. It is contemplated that the embodiment of the air-water separator 700 of FIG. 14 can be used in any suitable combination with any of the air-water separators described herein, e.g., any one or more of air-water separators 200, 300, 400, 500, 600.

In embodiments, one or more portions, or an entirety of the air-water separator can be formed using additive manufacturing, which allows for more complicated designs than the cast-in condensing heat exchangers. In embodiments, the air-water separator can be formed using laser powder bed fusion, including titanium laser powder bed fusion. One such design includes chevrons added to the slurper bar (e.g., planar body 224, 324, 424, 524, 624, 724) to direct water droplets towards the collection holes, and shaped to create re-circulation zones for the air to reduce the amount of air leakage into the slurper. Another design can include trenches added along the length of the slurper to collect the water in a slot that the air will pass over. Holes are drilled at the bottom of the trench to drain the water into the slurper channel. Another design includes adding patterns in the hydrophilic coating and holes on the leeward edge of the slurper bar take advantage of the surface tension forces from the water.

In embodiments, both the chevrons and trenches are designed to be offset on the top and bottom walls of the channel, to avoid a significant flow constriction. Embodiments as described herein can be additively manufactured, which simplifies manufacture and improves performance. Embodiments provide more effective and efficient isolation of water from the air more so more water can be collected with less air leakage. This improved effectiveness would require a lower pressure drop across the holes, which decreases the energy required to power the system.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
a liquid-gas separator including, a substantially planar body configured to be seated in a fluid flow to separate a flow of liquid from the fluid flow;
one or more apertures disposed in the body configured to collect the flow of liquid; and
one or more diverters integrally formed on or in the body configured to divert the flow of liquid towards the one or more apertures;
wherein the one or more diverters includes a pair of ramps angled oblique to a longitudinal axis of the planar body and diverging away from the planar body configured to direct the fluid flow up and over the pair of ramps and to separate the flow of liquid from the fluid flow and divert the flow of liquid between the pair of ramps.

2. The system of claim 1, wherein the pair of ramps are arranged to form a chevron pattern, wherein an aperture of the one or more apertures is disposed at a converging point of the chevron pattern.

3. The system of claim 2, wherein the pair of ramps is a first pair of ramps in a plurality of pairs of ramps, wherein the plurality of pairs of ramps are disposed along an axial length of the planar body.

4. The system of claim 1, wherein the one or more diverters includes a hydrophilic coating disposed on one or more portions of the planar body configured to separate the flow of liquid from the fluid flow and divert the flow of liquid towards the one or more apertures.

5. The system of claim 1, wherein the one or more diverters includes a hydrophobic coating disposed on one or more portions of the planar body configured to separate the flow of liquid from the fluid flow and divert the flow of liquid towards the one or more apertures.

6. The system of claim 1, further comprising a heat exchanger body including:
a heat exchanger core, the heat exchanger core including, gas flow path defined between a gas inlet and a gas outlet; and
a condensate flow path defined between the one or more apertures of the liquid-gas separator and a condensate outlet, wherein the liquid-gas separator is integrally formed with in the heat exchanger core such that the liquid-gas separator is disposed in the gas flow path, wherein the liquid-gas separator is configured to separate the flow of liquid from a flow of gas, direct the flow of gas to the gas outlet and divert the flow of liquid through the apertures and to the condensate outlet.

7. The system of claim 6, wherein the heat exchanger body includes a cross flow heat exchanger body, and further comprising a liquid flow path defined between a liquid inlet and a liquid outlet, wherein the liquid flow path is fluidly isolated from the gas flow path and the condensate flow path.

8. The system of claim 6, wherein the liquid-gas separator is configured to separate the flow of liquid from a flow of gas, direct the flow of gas to the gas outlet and divert the flow of liquid through the apertures and to the condensate outlet in a weightless environment.

9. The system of claim 8, wherein the weightless environment includes a spacecraft in outer space.

10. A system, comprising:
a liquid-gas separator including,
a substantially planar body configured to be seated in a fluid flow to separate a flow of liquid from the fluid flow;
one or more apertures disposed in the body configured to collect the flow of liquid; and
one or more diverters integrally formed on or in the body configured to divert the flow of liquid towards the one or more apertures;
wherein the one or more diverters includes a pair of ramps angled oblique to a longitudinal axis of the planar body and diverging away from the planar body configured to direct the fluid flow over the pair of ramps and to separate the flow of liquid from the fluid flow and divert the flow of liquid between the pair of ramps;
wherein the pair of ramps are arranged to form a chevron pattern, wherein an aperture of the one or more apertures is disposed at a converging point of the chevron pattern;
wherein the pair of ramps is a first pair of ramps in a plurality of pairs of ramps, wherein the plurality of pairs of ramps are disposed along an axial length of the planar body; and
wherein the planar body is a first planar body, and further comprising a second substantially planar body configured to be seated in the fluid flow opposite the first planar body forming a flow channel therebetween, wherein the second planar body includes:
one or more apertures disposed in the second planar body configured to collect a flow of liquid; and
one or more diverters integrally formed on or in the second planar body configured to divert the flow of liquid towards the one or more apertures,
wherein the one or more diverters of the second planar body includes a plurality of pairs of ramps angled oblique to a longitudinal axis of the planar body and diverging away from the second planar body configured to direct the fluid flow over each ramp of the plurality of pairs of ramps and to separate the flow of liquid from the fluid flow and divert the flow of liquid between each the pair of ramps, wherein each pair of ramps of the second planar body are arranged to form a chevron pattern, wherein an aperture of the one or more apertures of the second planar body is disposed at a converging point of the chevron pattern, wherein the plurality of pairs of ramps of the second planar body are disposed along an axial length of the second planar body, wherein the plurality of pairs of ramps and plurality of apertures of the second planar body are axially offset from the plurality of pairs of ramps and the plurality of apertures of the first planar body.

11. The system of claim 10, wherein the one or more diverters includes a hydrophilic coating disposed on one or more portions of the planar body configured to separate the flow of liquid from the fluid flow and divert the flow of liquid towards the one or more apertures.

12. The system of claim 10, further comprising a heat exchanger body including:
a heat exchanger core, the heat exchanger core including,
gas flow path defined between a gas inlet and a gas outlet; and
a condensate flow path defined between the one or more apertures of the liquid-gas separator and a condensate outlet, wherein the liquid-gas separator is integrally formed with in the heat exchanger core such that the liquid-gas separator is disposed in the gas flow path, wherein the liquid-gas separator is configured to separate the flow of liquid from a flow of gas, direct the flow of gas to the gas outlet and divert the flow of liquid through the apertures and to the condensate outlet.

13. The system of claim 12, wherein the heat exchanger body includes a cross flow heat exchanger body, and further comprising a liquid flow path defined between a liquid inlet and a liquid outlet, wherein the liquid flow path is fluidly isolated from the gas flow path and the condensate flow path.

14. The system of claim 12, wherein the liquid-gas separator is configured to separate the flow of liquid from a flow of gas, direct the flow of gas to the gas outlet and divert the flow of liquid through the apertures and to the condensate outlet in a weightless environment.

15. The system of claim 14, wherein the weightless environment includes a spacecraft in outer space.

\* \* \* \* \*